United States Patent
Schmidt et al.

(10) Patent No.: US 6,953,409 B2
(45) Date of Patent: Oct. 11, 2005

(54) TWO-MODE, COMPOUND-SPLIT, HYBRID ELECTRO-MECHANICAL TRANSMISSION HAVING FOUR FIXED RATIOS

(75) Inventors: Michael R. Schmidt, Carmel, IN (US); Donald Klemen, Carmel, IN (US); Larry T. Nitz, Brighton, MI (US); Alan G. Holmes, Fishers, IN (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/946,915

(22) Filed: Sep. 22, 2004

(65) Prior Publication Data

US 2005/0137042 A1 Jun. 23, 2005

Related U.S. Application Data

(60) Provisional application No. 60/531,528, filed on Dec. 19, 2003.

(51) Int. Cl.[7] .................................................. F16H 3/72
(52) U.S. Cl. ............................................................. 475/5
(58) Field of Search .............................. 475/5; 477/3.5; 180/65.2–62.4

(56) References Cited

U.S. PATENT DOCUMENTS

| 5,009,301 | A | | 4/1991 | Spitler ..................... 192/213.3 |
|---|---|---|---|---|
| 5,558,529 | A | | 9/1996 | Romatzick, Jr. ............ 439/188 |
| 5,931,757 | A | | 8/1999 | Schmidt ......................... 475/2 |
| 6,090,005 | A | * | 7/2000 | Schmidt et al. ................. 475/5 |
| 6,358,173 | B1 | * | 3/2002 | Klemen et al. ................. 475/5 |
| 6,491,599 | B1 | * | 12/2002 | Schmidt ......................... 475/5 |
| 6,551,208 | B1 | * | 4/2003 | Holmes et al. ................. 475/5 |

* cited by examiner

Primary Examiner—Roger Pang
(74) Attorney, Agent, or Firm—Leslie C. Hodges

(57) ABSTRACT

A two-mode, compound-split, electra-mechanical transmission utilizes an input member for receiving power from an engine, and an output member for delivering power from the transmission. First and second motor/generators are operatively connected to an energy storage device through a control for interchanging electrical power among the storage device, the first motor/generator and the second motor/generator. The transmission employs three planetary gear sets. Each planetary gear arrangement utilizes first, second and third gear members. Moreover, one gear member of the first or second planetary gear set is operatively connected to the input member, and one gear member of the third planetary gear set is selectively connected to ground. A lock-up clutch selectively locks two of the planetary gear sets in a 1:1 ratio.

26 Claims, 2 Drawing Sheets

| Mode | Clutch/Motor |
|---|---|
| Launch/Mode 1 | C1 GA MB (70) |
| 1st ~ 3.7 | C1 C4 (70,75) |
| 2nd ~ 1.7 | C1 C2 (70,62) |
| Mode 2 | C2 MA MB (62) |
| 3rd ~ 1.0 | C2 C4 (62,75) |
| 4th ~ .74 | C2 C3 (62,73) |

TWO-MODE, COMPOUND-SPLIT, HYBRID ELECTRO-MECHANICAL TRANSMISSION HAVING FOUR FIXED RATIOS

CROSS-REFERENCE TO RELATED APPLICATION

This application claims the benefit of U.S. Provisional Application No. 60/531,528, filed Dec. 19, 2003, which is hereby incorporated by reference in its entirety.

TECHNICAL FIELD

The present invention relates to a two-mode, compound-split, hybrid electro-mechanical vehicular transmission that utilizes three interactive planetary gear arrangements that are operatively connected to an engine and two motor/generators. The planetary gear arrangements provide two modes, or gear trains, that are selectively available, as by the utilization of four torque transfer devices, to transmit power from the engine and/or the motor/generators to the output member of the transmission. The transmission incorporates at least one mechanical point in its first mode of operation and at least two mechanical points in its second mode of operation, and provides four available fixed ratios.

BACKGROUND OF THE INVENTION

The purpose of a vehicular transmission is to provide a neutral, at least one reverse and one or more forward driving ranges that impart power from an engine, and/or other power sources, to the drive members which deliver the tractive effort from the vehicle to the terrain over which the vehicle is being driven. As such, the drive members may be front wheels, rear wheels or a track, as required to provide the desired performance.

A series propulsion system is a system in which energy follows a path from an engine to an electric storage device and then to an electrical motor which applies power to rotate the drive members. There is no direct mechanical connection between the engine and the drive members in a series propulsion system.

Transmissions adapted to receive the output power from either an engine or an electric motor, or both, have heretofore relied largely on what has been designated as series, hybrid propulsion systems. Such systems are designed with auxiliary power units (APUs) of relatively low power for minimum emissions and best fuel economy. However, such combinations of small APUs and even large energy storage devices do not accommodate high-average power vehicles or address duty cycles that demand continuous, constant speed operation. Steep grades and sustained high-average cruising speeds at desired high efficiencies are not achievable with a typical, series, hybrid transmission configuration.

The challenge, therefore, is to provide a power system that will operate at high efficiencies over a wide variety of operating conditions. Desirable electric variable transmissions should leverage the benefits of a series, hybrid transmission for desirable low-average power duty cycles—i.e., low speed start/stop duty cycles—as well as the benefits of a parallel hybrid transmission for high-average output power, high speed duty cycles. In a parallel arrangement the power supplied by the engine and the power supplied by the source of electrical energy are independently connected to the drive members.

Moreover, perfecting a concept wherein two modes, or two integrated power split gear trains, with either mode available for synchronous selection by the on-board computer to transmit power from the engine and/or the motor/generator to the output shaft results in a hybrid transmission having an extremely wide range of applications.

The desired beneficial results may be accomplished by the use of a variable, two-mode, input and compound split, parallel hybrid electro-mechanical transmission. Such a transmission utilizes an input member to receive power from the vehicle engine and a power output member to deliver power to drive the vehicle. First and second motor/generator power controllers are connected to an energy storage device, such as a batter pack, so that the energy storage devices can accept power from, and supply power to, the first and second motor/generators. A control unit regulates power flow among the energy storage devices and the motor/generators as well as between the first and second motor/generators.

A variable, two-mode, input-split, parallel, hybrid electro-mechanical transmission also employs at least one planetary gear set. The planetary gear set has an inner gear member and an outer gear member, each of which meshingly engages a plurality of planet gear members. The input member is operatively connected to one of the gear members in the planetary gear set, and means are provided operatively to connect the power output member to another of the gear members in the planetary gear set. One of the motor/generators is connected to the remaining gear member in the planetary gear set, and means are provided operatively to connect the other motor/generator to the output shaft.

Operation in the first or second mode may be selectively achieved by using torque transfer devices. Heretofore, in one mode the output speed of the transmission is generally proportional to the speed of one motor/generator, and in the second mode the output speed of the transmission is generally proportional to the speed of both motor/generators.

In some embodiments of the variable, two-mode, input-split, parallel, hybrid electro-mechanical transmission, a second planetary gear set is employed. In addition, some embodiments may utilize three torque transfer devices—two to select the operational mode desired of the transmission and the third selectively to disconnect the transmission from the engine. In other embodiments, all three torque transfer devices may be utilized to select the desired operational mode of the transmission.

With reference, again, to a simple planetary gear set, the planet gear members are normally supported for rotation on a carrier that is itself rotatable. When the sun gear is held stationary and power is applied to the ring gear, the planet gear members rotate in response to the power applied to the ring gear and thus "walk" circumferentially about the fixed sun gear to effect rotation of the carrier in the same direction as the direction in which the ring gear is being rotated.

When any two members of a simple planetary gear set rotate in the same direction and at the same speed, the third member is forced to turn at the same speed, and in the same direction. For example, when the sun gear and the ring gear rotate in the same direction, and at the same speed, the planet gears do not rotate about their own axes but rather act as wedges to lock the entire unit together to effect what is known as direct drive. That is, the carrier rotates with the sun and ring gears.

However, when the two gear members rotate in the same direction, but at different speeds, the direction in which the third gear member rotates may often be determined simply by visual analysis, but in many situations the direction will not be obvious and can only be determined by knowing the number of teeth present in the gear members of the planetary gear set.

Whenever the carrier is restrained from spinning freely, and power is applied to either the sun gear or the ring gear, the planet gear members act as idlers. In that way, the driven member is rotated in the opposite direction as the drive member. Thus, in many transmission arrangements when the reverse drive range is selected, a torque transfer device serving as a brake is actuated frictionally to engage the carrier and thereby restrain it against rotation so that power applied to the sun gear will turn the ring gear in the opposite direction. Thus, if the ring gear is operatively connected to the drive wheels of a vehicle, such an arrangement is capable of reversing the rotational direction of the drive wheels, and thereby reversing the direction of the vehicle itself.

As those skilled in the art will appreciate, a transmission system using a power split arrangement will receive power from two sources. Utilization of one or more planetary gear sets permits two or more gear trains, or modes, by which to deliver power from the input member of the transmission to the output member thereof.

U.S. Pat. No. 5,558,589 which issued on Sep. 24, 1996 to General Motors Corporation, as is hereby incorporated by reference, teaches a variable, two-mode, input-split, parallel, hybrid electro-mechanical transmission wherein a "mechanical point" exists in the first mode and two mechanical points exist in the second mode. U.S. Pat. No. 5,931,757 which issued on Aug. 3, 1999 to General Motors Corporation, and is hereby incorporated by reference, teaches a two-mode, compound-split, electro-mechanical transmission with one mechanical point in the first mode and two mechanical points in the second mode.

A mechanical point occurs when either of the motor/generators is stationary at any time during operation of the transmission in either the first or second mode. The lack of a mechanical point is a drawback inasmuch as the maximum mechanical efficiency in the transfer of power from the engine to the output occurs when one of the motor/generators is at a mechanical point—i.e., stationary. In variable, two-mode, input-split, parallel, hybrid electro-mechanical transmissions, however, there is typically one point in the second mode at which one of the motor/generators is not rotating such that all the engine power is transferred mechanically to the output.

The two-mode, compound-split, electro-mechanical transmission referenced above is an efficient option for commercial-duty vehicles, such as transient buses and the like, which regularly operate at close to their maximum capacity.

SUMMARY OF THE INVENTION

The present invention provides an adaptation of a two-mode, compound-split, electro-mechanical transmission which is particularly useful in personal trucks, wherein the typical load is less than half of maximum capacity. The novel transmission uses a lock-up clutch and provides four available mechanical points. It enables maximum power to be reached more quickly for passing, towing and hauling, and enables the use of smaller electrical components with high power engines which may be cost-effectively implemented into personal trucks. By providing fixed ratios in an electrically variable transmission, maximum fuel economy is achieved at a reasonable cost.

It is, therefore, a primary object of the present invention to provide a novel, two-mode, compound-split, electro-mechanical transmission that provides a lock-up clutch to achieve maximum power quickly for passing, towing and hauling in a personal truck or the like, while providing four available fixed ratios and operating with at least one mechanical point in the first mode and at least two mechanical points in the second mode—i.e., three mechanical points, one at each of three separate vehicle speeds.

It is another object of the present invention to provide a novel transmission, as above, wherein the planetary gear arrangements and the motor/generators are coaxially disposed.

It is a further object of the present invention to provide a novel transmission, as above, wherein the planetary gear arrangements are disposed radially inwardly of the annularly configured motor/generators to minimize the envelope—i.e., at least the circumferential dimension—of the transmission.

It is still another object of the present invention to provide a novel transmission, as above, wherein the operational results can be achieved with three simple planetary gear sets.

It is an even further object of the present invention to provide a novel transmission, as above, wherein the transmission is operated by four torque transfer devices.

These and other objects of the invention, as well as the advantages thereof over existing and prior art forms, which will be apparent in view of the following detailed specification, are accomplished by means hereinafter described and claimed.

By way of a general introductory description, a two-mode, compound-split, electro-mechanical transmission embodying the concepts of the present invention utilizes an input member for receiving power from a prime mover power source and an output member for delivering power from the transmission. First and second motor/generators are operatively connected to an energy storage device for interchanging electrical power between the storage device and the first and second motor/generators. A control unit is provided for regulating the electrical power interchange between the energy storage device and the first and second motor/generators. The control unit also regulates electrical power interchange between the first and second motor/generators.

The subject transmission employs three planetary gear sets which are coaxially aligned. Each planetary gear arrangement utilizes first, second and third gear members. The first and second motor/generators are coaxially aligned with each other as well as the three planetary gear sets which are circumscribed by the first and second motor/generators.

At least one of the gear members in the first or second planetary gear sets is connected to the first motor/generator. Another one of the gear members in the second and third planetary gear sets is connected to the second motor/generator. One of the gear members of the first planetary gear set is continuously connected to one of the gear members in the second planetary gear set. One of the gear members of the second planetary gear set is continuously connected to one of the gear members in the third planetary gear set. One of the members of the first planetary gear set is operatively connected to the input member.

A first torque-transmitting mechanism selectively connects one of the gear members associated with each of the first, second and third planetary gear sets to each other and to the output member. A second torque-transmitting mechanism selectively connects one of the gear members of the third planetary gear set with ground. A third torque-transmitting mechanism selectively connects one of the gear members of the second planetary gear set with another of the gear members of the second planetary gear set, thereby operating as the above-mentioned lock-up clutch. A fourth torque-transmitting mechanism selectively grounds one of the gear members connected by the third torque-transmitting mechanism.

The four torque-transmitting mechanisms are selectively engaged in combinations of two to provide four available fixed ratios between the input member and the output member when no power flows through the first and second motor/generators.

The transmission is further characterized by having three available mechanical points of operation at which one of the first and second motor/generators is stationary.

The above features and advantages, and other features and advantages of the present invention are readily apparent from the following detailed description of the best modes for carrying out the invention when taken in connection with the accompanying drawings.

DESCRIPTION OF THE PREFERRED EMBODIMENTS

Figures 1, 2:
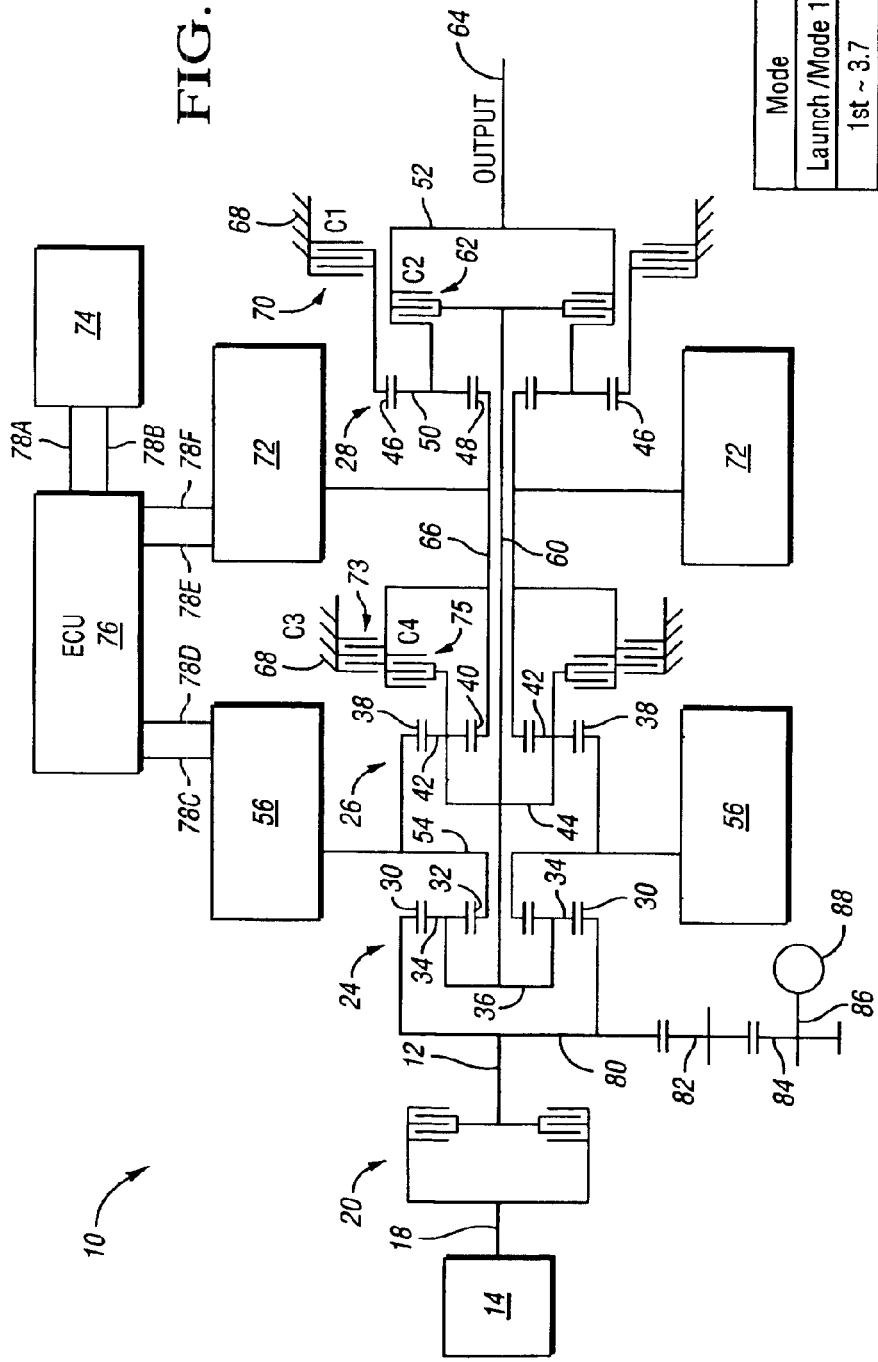
FIG. 1 is a schematic representation of a two-mode, compound-split, electro-mechanical transmission embodying the concepts of the present invention.
FIG. 2 is a fixed ratio truth table for the transmission represented by FIG. 1.

One representative form of a two-mode, compound-split, electro-mechanical transmission embodying the concepts of the present invention is depicted in FIG. 1, and is designated generally by the numeral 10. The hybrid transmission 10 has an input member 12 that may be in the nature of a shaft which may be directly driven by an engine 14. A transient torque damper may be incorporated between the output shaft 18 of the engine 14 and the input member 12 of the hybrid transmission 10. An example of a transient torque damper of the type recommended for the present usage is disclosed in detail in U.S. Pat. No. 5,009,301 which issued on Apr. 23, 1991 to General Motors Corporation, which is hereby incorporated by reference in its entirety. The transient torque damper may incorporate, or be employed in conjunction with, a torque transfer device 20 to permit selective engagement of the engine 14 with the hybrid transmission 10, but it must be understood that the torque transfer device 20 is not utilized to change, or control, the mode in which the hybrid transmission 10 operates.

In the embodiment depicted the engine 14 may be a fossil fuel engine, such as a diesel engine which is readily adapted to provide its available power output delivered at a constant number of revolutions per minute (RPM). In the exemplary embodiment, the engine 14 can—after start-up, and during the majority of its input—operate at a constant speed of approximately 6000 RPM, as represented by curve 22 on FIG. 3. Although it must be understood that the speed and horsepower output of the engine 14 is not critical to the invention, for the purpose of effecting an absolutely clear understanding of the hybrid transmission 10, an available output of about 305 horsepower from engine 14 will be assumed for the description of an exemplary installation. Irrespective of the means by which the engine 14 is connected to the input member 12 of the transmission 10, the input member 12 is connected to a planetary gear set 24 in the transmission 10.

The hybrid transmission 10 utilizes three planetary gear sets 24, 26 and 28. The first planetary gear set 24 has an outer gear member 30, that may generally be designated as the ring gear, which circumscribes an inner gear member 32, generally designated as the sun gear. A plurality of planet gear members 34 are rotatably mounted on a carrier 36 such that each planet gear member 34 meshingly engages both the outer gear member 30 and the inner gear member 32.

The second planetary gear set 26 also has an outer gear member 38, generally designated as the ring gear, which circumscribes an inner gear member 40, generally designated as the sun gear. A plurality of planet gear members 42 are rotatably mounted on a carrier 44 such that each planet gear 42 meshingly engages both the outer gear member 38 and the inner gear member 40.

The third planetary gear set 28 also has an outer gear member 46, generally designated as the ring gear, which circumscribes an inner gear member 48, generally designated as the sun gear. A plurality of planet gear members 50 are rotatably mounted on a carrier 52 such that each planet gear 50 meshingly engages both the outer gear member 46 and the inner gear member 48.

In this embodiment, the ring gear/sun gear tooth ratio of the planetary gear set 24 is 65/33; the ring gear/sun gear tooth ratio of the planetary gear set 26 is 65/33; and the ring gear/sun gear tooth ratio of the planetary gear set 28 is 94/34.

While all three planetary gear sets 24, 26 and 28 are "simple" planetary gear sets in their own right, the first and second planetary gear sets 24 and 26 are compounded in that the inner gear member 32 of the first planetary gear set 24 is conjoined, as through a hub plate gear 54, to the outer gear member 38 of the second planetary gear set 26. The conjoined inner gear member 32 of the first planetary gear set 24 and the outer gear member 38 of the second planetary gear set 26 are continuously connected to a first motor/generator 56.

The planetary gear sets 24 and 26 are further compounded in that the carrier 36 of the first planetary gear set 24 is conjoined, as through a shaft 60, to the carrier 44 of the second planetary gear set 26. As such, carriers 36 and 44 of the first and second planetary gear sets 24 and 26, respectively, are conjoined. The shaft 60 is also selectively connected to the carrier 52 of the third planetary gear set 28, as through a torque transfer device 62 which, as will be hereinafter more fully explained, is employed to assist in the selection of the operational modes of the hybrid transmission 10.

The carrier 52 of the third planetary gear set 28 is connected directly to the transmission output member 64. When the hybrid transmission 10 is used in a land vehicle, the output member 64 may be connected to the vehicular axles (not shown) that may, in turn, terminate in the drive members (also not shown). The drive members may be either front or rear wheels of the vehicle on which they are employed, or they may be the drive gear of a track vehicle.

The inner gear member 40 of the second planetary gear set 26 is connected to the inner gear member 48 of the third planetary gear set 28, as through a sleeve shaft 66 that circumscribes shaft 60. The outer gear member 46 of the third planetary gear set 28 is selectively connected to ground, represented by the transmission housing 68, through a torque transfer device 70. Torque transfer device 70, as is also hereinafter explained, is also employed to assist in the selection of the operational modes of the hybrid transmission 10. The sleeve shaft 66 is also continuously connected to a second motor/generator 72. All the planetary gear sets 24, 26 and 28 as well as the two motor/generators 56 and 72 are coaxially oriented, as about the axially disposed shaft 60. It should be noted that both motor/generators 56 and 72 are of an annular configuration which permits them to circumscribe the three planetary gear sets 24, 26 and 28 such that the planetary gear sets 24, 26 and 28 are disposed radially inwardly of the motor/generators 56 and 72. This configuration assures that the overall envelope—i.e., the circumferential dimension—of the transmission 10 is minimized.

A torque transfer device 73 selectively connects the sun gear 40 with ground (i.e., with transmission housing 68). A torque transfer device 75 is operative as a lock-up clutch, locking planetary gear sets 24, 26, motors 56, 72 and the input to rotate as a group, by selectively connecting the sun gear 40 with the carrier 44. The torque transfer devices 62, 70, 73, 75 are all friction clutches.

As was previously herein explained in conjunction with the description of the engine 14, it must similarly be understood that the rotational speed and horsepower output of the first and second motor/generators 56 and 72 are also not critical to the invention, but for the purpose of effecting an absolutely clear understanding of the hybrid transmission 10, the motors/generators 56 and 72 have a continuous rating of 30 horsepower and a maximum speed of about 10200 RPM. The continuous power rating is approximately ¹⁄₁₀ that of the engine 14, and the maximum speed is approximately 1.5× that of the engine 14, although these depend on the type of engine, final gear schematic and duty cycle.

As should be apparent from the foregoing description, and with particular reference to FIG. 1, the transmission 10 selectively receives power from the engine 14. As will now be explained, the hybrid transmission also receives power from an electric storage device 74. The electric storage device 74 may be one or more batteries. Other electric storage devices that have the ability to store electric power and dispense electric power may be used in place of the batteries without altering the concepts of the present invention. As was explained in conjunction with the description of the engine 14 and the motor/generators 56 and 72, it must similarly be understood that the horsepower output of the electrical storage device 74 is also not critical to the invention, but for the purpose of effecting an absolutely clear understanding of the hybrid transmission 10 an output of about 75 horsepower from the electrical storage device 74 will be assumed for description of an exemplary device. The battery pack is sized depending on regenerative requirements, regional issues such as grade and temperature, and propulsion requirements such as emissions, power assist and electric range.

The electric storage device 74 communicates with an electrical control unit (ECU) 76 by transfer conductors 78A and 78B. The ECU 76 communicates with the first motor/generator 56 by transfer conductors 78C and 78D, and the ECU 76 similarly communicates with the second motor/generator 72 by transfer conductors 78E and 78F.

As apparent from the previous paragraph, a particular structural member, component or arrangement may be employed at more than one location. When referring generally to that type of structural member, component or arrangement, a common numerical designation will be employed. However, when one of the structural members, components or arrangements so identified is to be individually identified, it will be referenced by virtue of a letter suffix employed in combination with the numerical designation employed for general identification of that structural member, component or arrangement. Thus, there are at least six transfer conductors which are generally identified by the numeral 78, but the specific, individual transfer conductors are, therefore, identified as 78A, 78B, 78C, 78D, 78E and 78F in the specification and on the drawings. This same suffix convention shall be employed throughout the specification.

A drive gear 80 may be presented from the input member 12. As depicted, the drive gear 80 fixedly connects the input member 12 to the outer gear member 30 of the first planetary gear set 24, and the drive gear 80, therefore, receives power from the engine 14 and/or the motor/generators 56 and/or 72. The drive gear 80 meshingly engages an idler gear 82 which, in turn, meshingly engages a transfer gear 84 that is secured to one end of a shaft 86. The other end of the shaft 86 may be secured to a transmission fluid pump and/or PTO unit, designated either individually or collectively at 88.

Operation of the Exemplary Preferred Embodiment

Introduction

The operator of the vehicle has three, well-known, primary devices to control the transmission 10. One of the primary control devices is a well known drive range selector (not shown) that directs the ECU 76 to configure the transmission for either the park, reverse, neutral, or forward drive range. The second and third primary control devices constitute an accelerator pedal (not shown) and a brake pedal (also not shown). The information obtained by the ECU 76 from these three primary control sources will hereinafter be referred to as the "operator demand." The ECU 76 also obtains information from both the first and second motor/generators 56 and 72, respectively, the engine 14 and the electric storage device 84. In response to an operator's action, the ECU 76 determines what is required and then manipulates the selectively operated components of the hybrid transmission 10 appropriately to respond to the operator demand.

For example, in the exemplary embodiment shown in FIG. 1, when the operator has selected a forward drive range and manipulates either the accelerator pedal or the brake pedal, the ECU 76 determines if the vehicle should accelerate or decelerate. The ECU 76 also monitors the state of the power sources, and determines the output of the transmission required to effect the desired rate of acceleration or deceleration. Under the direction of the ECU 76, the transmission is capable of providing a range of output speeds from slow to fast in order to meet the operator demand.

In order to provide a full explanation as to the operation of a transmission embodying the concepts of the present invention, a description of the operational modes employed to achieve the output power and speeds necessary to meet the operator demand under various operating conditions will be provided with respect to the preferred embodiment. As such, the following description describes the full power operational states of the particular transmission identified by the numeral 10.

To reiterate, the transmission 10 is a two-mode, compound-split, electro-mechanical, vehicular transmission. In other words, the output member 64 receives power through two distinct gear trains within the transmission 10. A first mode, or gear train, is selected when the torque transfer device 70 is actuated in order to "ground" the outer gear member 46 of the third planetary gear set 28. A second mode, or gear train, is selected when the torque transfer device 70 is released and the torque transfer device 62 is simultaneously actuated to connect the shaft 60 to the carrier 52 of the third planetary gear set 28.

Those skilled in the art will appreciate that the ECU 76 serves to provide a range of output speeds from relatively slow to relatively fast within each mode of operation. This combination of two modes with a slow to fast output speed range in each mode allows the transmission 10 to propel a vehicle from a stationary condition to highway speeds while satisfying the other objects of the invention. Additionally, the ECU 76 coordinates operation of the transmission 10 so as to allow synchronized shifts between the modes. As noted, operation of the preferred embodiment will be described as it relates to full power operation inasmuch as that approach will fully describe the general operational concepts.

In the following description, it should be noted that the first and second "modes" of operation refer to circumstances in which the transmission functions are controlled by one clutch, clutches 62 or 70, and by the controlled speed and torque of the motor/generators 56 and 72, all as described in U.S. Pat. No. 5,009,301 which issued on Apr. 23, 1991 to General Motors Corporation. Also, certain "ranges" of operation are described below in which fixed ratios are achieved by applying an additional clutch. This additional clutch may be clutch 62, 73 or 75.

When the additional clutch is applied, a fixed input to output speed ratio is achieved, as illustrated in the truth table of FIG. 2 (i.e., when two clutching mechanisms are applied). The rotations of the motor/generators 56, 72 will then be dependent on internal rotation of the mechanism as defined by the clutching and proportional to the input speed. The motor/generators, however, still can function as motors or generators, however, they are completely independent of engine to output power flow, thereby enabling both to be motors, both to function as generators, or any combination thereof. This allows, for instance, during acceleration in the first fixed ratio (RANGE 1 in FIG. 3) that the engine power and both units functioning as motors accepting power from the energy storage device 74 to be additive into propelling the vehicle through planetary gear set 28 to output 64.

It also should be noted that the function of the transmission can at any time be switched from operation in fixed ratio to mode control by turning the additional clutch on or off during a mode of operation. Determination of operation in fixed ratio or mode control is by algorithms in the ECU 76 controlling the transmission.

Figure 3:
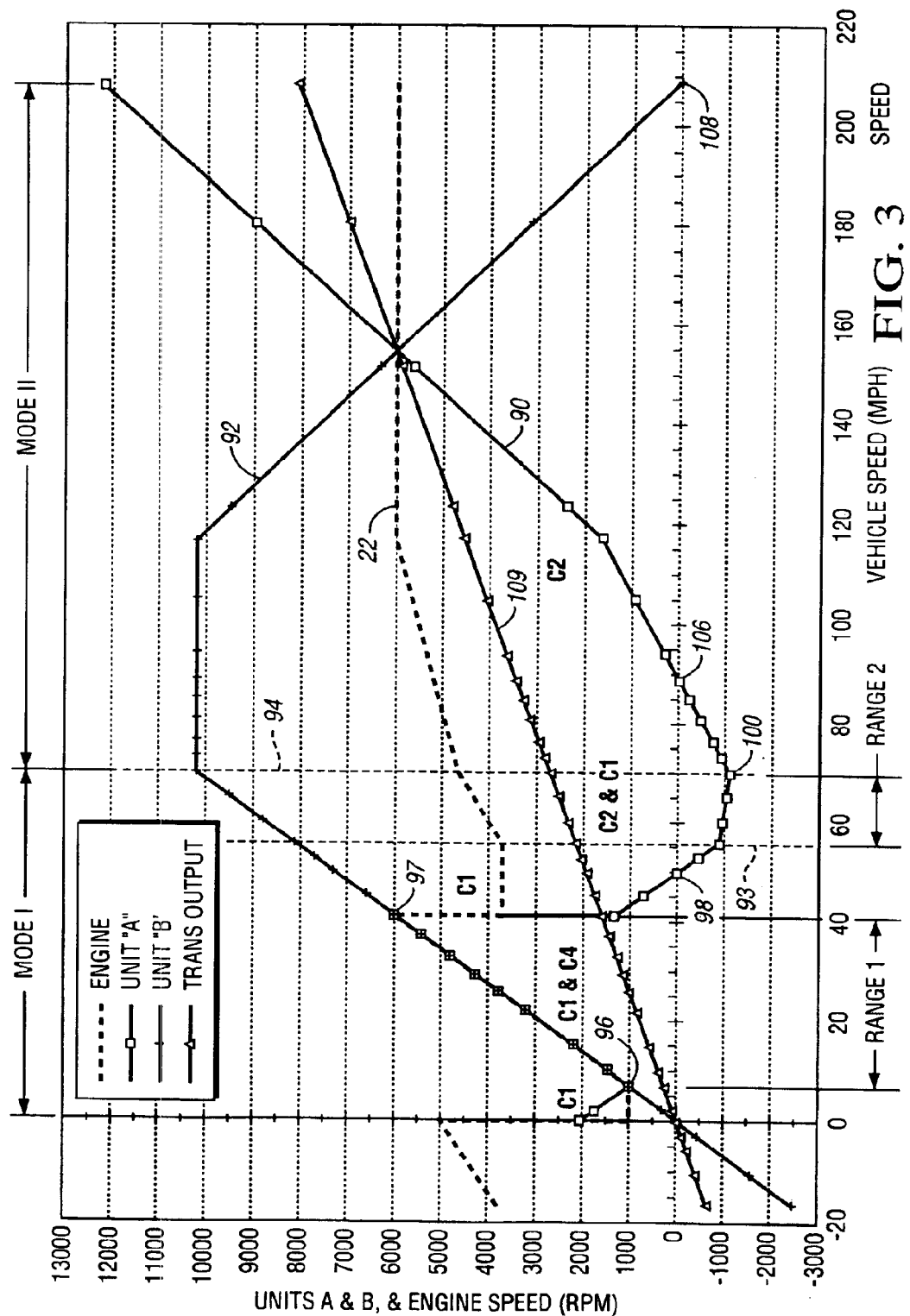
FIG. 3 is a graphical representation of the rotations per minute (RPM) of each motor/generator as well as the engine relative to the speed of the vehicle in miles per hour (MPH).

It also should be noted that the modes of operation may overlap the ratio of operation, and selection depends again on the driver's input and response of the vehicle to that input. As shown in FIG. 3, RANGE 1 falls within mode I operation when C1 and C4 (clutches 70 and 75) are engaged, and RANGE 2 falls within mode I when C2 and C1 (clutches 62 and 70) are engaged. As illustrated in FIG. 2, a third fixed ratio range is available during mode II when C2 and C4 (clutches 62 and 75) are engaged, and a fourth fixed ratio range is available during mode II when C2 and C3 (clutches 62 and 73) are engaged.

I. First Mode

In the first mode of operation, and when the ECU 76 has determined that the operator desires to move forwardly from a stationary condition, and to accelerate, the torque transfer device 20 is engaged operatively to connect the engine 14 to the hybrid transmission 10, and torque transfer device 20 remains applied as the vehicle moves forwardly through a speed range hereinafter more fully described. The torque transfer device 62 is not applied, and it remains disengaged. The torque transfer device 70 is engaged. In this situation, the engine 14 applies driving power to the outer gear member 30 of the first planetary gear set 24 so the outer member 30 rotates in unison with the input member 12 (and thus the engine 14). The first motor/generator 56 simultaneously rotates the inner gear member 32 of the first planetary gear set 24 and the outer gear member 38 of the second planetary gear set 26 in the same direction, thus driving the carrier 36 in the same direction—which effects rotation of the inner gear member 40 of the second planetary gear set 24.

The second motor/generator 72 operates as a motor during the first mode, and as such motor/generator 72 drives sleeve shaft 66 in that direction which rotates the inner gear member 48 of the third planetary gear set 28 to rotate the planet gears 50 of the third planetary gear set 28 against the outer gear member 46 of the third planetary gear set 28. The outer gear member 46 is fixed by having been grounded so that the carrier 52 drives the output member 64 in that direction required to effect forward movement of the vehicle.

That rotation of the sleeve shaft 66 effected by rotation of the second motor/generator 72 operating as a motor also rotates the inner gear member 40 of the second planetary gear set 26. Because the torque transfer device 62 remains disengaged, the carriers 36 and 44 of the first and second planetary gear sets 24 and 26, respectively, are freely rotatable—but only in unison inasmuch as the two carriers 36 and 44 are compounded. As a result, the rotation of the outer gear member 30 of the first planetary gear set 24 effected by the engine 14 and the rotation of the inner gear member 40 effected by the second motor/generator 72 force the inner gear member 32 of the first planetary gear set 24 and the conjoined outer gear member 38 of the second planetary gear set 26 to drive the first motor/generator 56 in that direction, and velocity, which causes the first motor/generator 56, at least initially, to serve as a generator.

With reference to FIG. 3, curve 22 is the plot of the engine speed in revolutions per minute (RPM) against the speed in miles per hour (MPH) of the vehicle in which the engine 14 and hybrid transmission 10 are incorporated. For convenience, it will be noted that curve 22 is uninterrupted by visual plot points. Curve 90 is the plot of the rotational speed (RPM) of the first motor/generator 56 (Unit A), also relative to the speed (MPH) of the vehicle. This curve may be readily distinguished by the fact that the plot points appear as small squares. Curve 92 is the plot of the rotational speed (RPM) of the second motor/generator 72 (Unit B) relative to the speed (MPH) of the vehicle. This curve may be readily distinguished by the fact that the plot points appear as small plus (+) signs.

Ignoring the fixed ratio operations for this part of the description, the first operational mode of transmission 10 extends from the abscissa, which designates engine speed (RPM), to line 94 which is drawn parallel to the abscissa and which defines the shift from operation of the transmission 10 in the first mode to the second mode. In the representative embodiment described, the first mode extends from the vehicle at rest to a forward speed on the order of about 70 MPH. At speeds greater than about 70 MPH the transmission operates in the second mode.

As previously noted, the second motor/generator operates as a motor through the entire first mode—i.e., from zero to about 70 MPH.

Unique to this invention is that the fixed ratios can be selected, overlapping the operation of the modes, to further improve acceleration by increasing the power reaching the output 64.

In this invention, both ratios and modes are used to improve performance or efficiency. The new operation up to line 94 in FIG. 3 (approximately 70 MPH), occurs as follows: Starting in mode I, the first motor/generator 56, however, operates as a generator until approximately 70 MPH—represented by plot point 96 on curve 90. At about 7 MPH, the lock-up clutch 75 is engaged while the clutch 70 remains engaged. In this configuration, the transmission 10 is engaged in the first fixed ratio as defined by the planetary gear set 28, as illustrated in the fixed ratio table of FIG. 2. When the clutch 75 is engaged, the first two gear sets 24, 26 and motor/generators 56, 72 rotate at the input speed, and are connected with the sun gear 48, and with the clutch 70 also engaged there is a speed reduction provided by planetary gear set 28 and torque is multiplied. All power is transmitted mechanically through the planetary gear sets. With no torque present in the motors/generators 56, 72, there are no electrical losses, thus providing a higher efficiency operation, however, with full torque applied in motor/generators 56, 72, a significant increase in performance can be realized. With both motors locked together by device 75, they also can share equally any regenerative power, thereby resulting in higher braking performance with improved cooling. Only the planetary gear set 28 is active because the torque transmitting device, (lock-up clutch) 75 locks up the planetary gear sets 24 and 26. Engagement of the torque transmitting device also protects the motors/generators 56, 72 if the power flow necessary for power split operation is more than the motors/generators would tolerate. Therefore, if the vehicle is towing or hauling up a hill, then the motors/generators are protected.

In normal operation, only the clutch 70 would be engaged at low speeds, but if maximum power is demanded, then the lock-up clutch 75 is also engaged. The motors 56, 72 may be turned on with the clutch 75 to achieve maximum available horsepower, and the motors/generators' 56, 72 power may be reduced to reduce operating temperatures. This clutch also provides the ability for the engine 14 and both motor/generators 56, 72, to all three simultaneously propel the vehicle for maximum acceleration.

Returning to FIG. 3, at plot point 97 the lock-up clutch 75 is disengaged. Thereafter, the motor/generator 72 acts as a motor, and the motor/generator 56 acts as a generator up to the mechanical point 98 wherein the motor/generator 56 is stationary. The motor/generator 56 then reverses direction and acts as a motor.

The clutch 62 is then engaged at about 57 MPH, which corresponds with vertical line 93 of FIG. 3. With the clutches 62 and 70 engaged, a second fixed ratio is achieved. All three gear sets 24, 26, 28 are active, and the ratio is 1.7:1, as indicated in the fixed ratio table of FIG. 2. The motors/generators 56, 72 may be turned off during the engagement of the clutches 62 and 70 for fully mechanical operation. During the second fixed ratio, the motors 56, 72 may freewheel and no torque is present. The first mode ends at line 94 of FIG. 3 when the clutch 70 is turned off and the clutch 62 remains engaged for the high-efficiency second mode of operation.

In the above description, the transmission mode I as described in U.S. Pat. No. 5,009,031, is supplemented with the ability to launch in mode I, shift to fixed ratio 1, return to mode I, and then to fixed ratio 2. The actual operation in the vehicle is determined by inputs to the ECU 76. The transmission may be operated in only mode I, or any combination as necessary to improve efficiency, performance, or braking power up to line 94 of FIG. 3.

Should one wish to duplicate the results described herein, the outer gear members 30 and 38 in each of the first and second planetary gear sets 24 and 26 have 65 teeth, and the inner gear members 32 and 40 in each of the first and second planetary gear sets 24 and 26 have 33 teeth. The outer gear member 46 of the third planetary gear set 28 has 94 teeth, and the inner gear member 48 of the third planetary gear set 28 has 34 teeth. With the configuration of the transmission 10 heretofore described, and with the aforesaid number of teeth on the inner and outer gear members, the transmission provides a mechanical point (98) while operating in the first mode. That is, the first motor/generator 56 has a zero rotational speed at about 50 MPH, as depicted by plot point 98 on curve 90. To complete the description as to the operation of the motor/generators in the exemplary environment described, one must consider operation of the transmission in the second mode of operation.

II. Second Mode

The transition from the first to the second mode of operation is achieved by disengaging torque transfer device 70 and continuing the application of torque transfer device 62. Similar to the previously described mode I overlap with fixed ratios, mode II overlaps fixed ratios in the truth table of FIG. 2, as determined by internal and engine speed limitations. At the inception of the second mode of operation, the first motor/generator 56 transitions from operating as a motor to operating as a generator, however this is influenced by the planetary gear ratio selections. Inasmuch as the transition from operation of the transmission 10 in the first mode to operation in the second mode occurs at line 94, the transition of the first motor/generator 56 from a motor to a generator occurs at point 100 on curve 90, which also delineates the intersection of the curve 92 with line 94. The first motor/generator 56 continues to operate as a generator during operation of the transmission 10 in the second mode while the vehicle gains speed from about 70 MPH to about 88 MPH. At about 88 MPH the first motor/generator 56 transitions from operation as a generator back to operation as a motor as it transitions through the mechanical point 106 wherein the motor/generator 56 has zero rotational speed. The first motor/generator 56 continues thereafter to operate as a motor.

At the beginning of the second mode of operation, the second motor/generator 72 continues to operate as a motor. In fact, the second motor/generator 72 operates as a motor until the vehicle reaches a speed of about 88 MPH, at which point it transitions to operation as a generator, and continues thereafter to operate as a generator.

With the configuration of the transmission 10 heretofore described, and with the aforesaid number of teeth on the inner and outer gear members, the transmission 10 provides two mechanical points while operating in the second mode. That is, the first motor/generator 56 has a zero rotational speed at about 88 MPH, as designated by point 106 on curve 90. In addition, the second motor/generator 72 has a zero rotational speed at about 208 MPH, as designated by point 108 on curve 92. Hence, the transmission 10 provides two mechanical points in the second mode of operation.

As illustrated in the fixed ratio table of FIG. 2, third and fourth fixed ratios are available during the second mode. The third fixed ratio may be established with the simultaneous engagement of the clutches 62 and 75, which locks all gear sets into a 1:1 ratio so that the output 64 rotates at the same speed as the input 12.

The fourth fixed ratio is established with the engagement of the clutches 62 and 73 to provide a fixed overdrive ratio of 0.74:1, as illustrated in the fixed ratio table of FIG. 2. In the fourth fixed ratio, the first and second planetary gear sets 24 and 26 are active, and the motors/generators 56, 72 may freewheel with no torque present.

Accordingly, the transmission 10 of the invention provides three mechanical points and four available fixed ratios, thereby minimizing electrical losses in the motors/generators while providing maximum power quickly in the first mode via the lock-up clutch 75.

It should be understood that the exact location of the aforesaid mechanical points is determined not only by the number of teeth on the inner and outer gear members of the planetary gear sets, but also by the rotational speed of the input shaft 12. Hence, with the number of teeth disclosed for the inner and outer gear members in the exemplary embodiment, an increase in the speed of the input shaft 12 will shift the locations of the mechanical points to higher vehicular speeds, and conversely, a reduction in the speed of the input member 12 will shift the mechanical points to lower vehicular speeds.

Alternate C4 Engagements:

The C4 clutch 75 shown schematically between the planet carrier 44 and the sun gear 40 may also be located to connect the ring gear 38 and the sun gear 40, and will provide the same lockup function. The C3 brake, 73, however, must remain as shown to brake rotation of sleeve shaft 66.

III. Reverse Mode

The reverse mode of operation is effected by having the ECU 76 operate the second motor/generator 72 as a motor, but reversing its rotational direction from the direction in which the second motor/generator 72 rotates when the vehicle begins to move forwardly from a stationary position in the first mode of operation.

IV. Summation

The present invention provides an adaptation of a two-mode, compound-split, electro-mechanical transmission which is particularly useful in personal trucks, wherein the typical load is less than half of maximum capacity. The novel transmission uses a lock-up clutch and provides four available mechanical points. It enables maximum power to be reached more quickly for towing and hauling, and enables the use of smaller electrical components which may be cost-effectively implemented into personal trucks. By providing fixed ratios in an electrically variable transmission, maximum fuel economy is achieved at a reasonable cost.

The transmission 10 also provides a single mechanical point during operation in the first mode and two mechanical points during operation in the second mode. As represented by curve 109 on FIG. 3, the transmission 10 provides a continuously increasing output speed throughout its entire operational range. The foregoing transmission employs three planetary gear sets to provide the two-mode operation when operatively controlled by four torque transfer devices. Moreover, the three planetary gear sets 24, 26 and 28 as well as both motor/generators 56 and 72 are coaxially disposed with the annular motor/generators 56 and 72 circumscribing the three planetary gear sets 24, 26 and 28 in order to minimize the required envelope—i.e., circumferential dimension—of the transmission 10.

Alternative Embodiment

The invention also contemplates that the lock-up clutch 75 could be positioned elsewhere on the planetary gear sets 24, 26. For example, the lock-up clutch may connect the sun gear 40 and ring gear 48 of the second planetary gear set 26. As a further alternative, the lock-up clutch may connect the carrier 36 and ring gear 30 of the first planetary gear set 24.

Conclusion

While only a preferred, and two alternative, embodiments of the present invention are disclosed, it is to be understood that the concepts of the present invention are susceptible to numerous changes apparent to one skilled in the art. Therefore, the scope of the present invention is not to be limited to the details shown and described but is intended to include all variations and modifications which come within the scope of the appended claims.

What is claimed is:

1. A two-mode compound split hybrid electro-mechanical transmission, comprising:

an input member for receiving power from a prime mover power source;

an output member for delivering power from the transmission;

first and second motor/generators;

an energy storage device for interchanging electrical power with said first and second motor/generators;

a control unit for regulating the electrical power interchange between said energy storage device and said first and second motor/generators and also for regulating electrical power interchange between said first and second motor/generators;

three coaxially aligned planetary gear arrangements, each planetary gear arrangement utilizing first, second and third gear members;

said first and second motor/generators being coaxially aligned with each other and with said three planetary gear arrangements;

at least one of said gear members in said first or second planetary gear arrangement connected to said first motor/generator;

another one of said gear members in said second and third planetary gear arrangement being connected to said second motor/generator;

a first torque-transmitting mechanism selectively connecting one of said gear members associated with each of said first, second and third planetary gear arrangements to each other and to said output member;

a second torque-transmitting mechanism selectively connecting one of said gear members of said third planetary gear set with ground;

a third torque-transmitting mechanism selectively connecting one of said gear members of said second planetary gear set with another of said gear members of said second planetary gear set;

a first interconnecting member continuously connecting one of said members of said first planetary gear set with one of said members of said second planetary gear set;

a second interconnecting member continuously connecting one of said members of said second planetary gear set with one of said members of said third planetary gear set; and one of said gear members of said first planetary gear arrangement being continuously connected to said input member.

2. An electro-mechanical transmission, as set forth in claim 1, further comprising:

a fourth torque-transmitting mechanism selectively grounding one of said gear members connected by said third torque-transmitting mechanism.

3. An electro-mechanical transmission, as set forth in claim 2, wherein:

said first and second motor/generators annularly circumscribe said coaxially disposed planetary gear arrangements.

4. An electro-mechanical transmission, as set forth in claim 3, wherein:

said planetary gear arrangements are disposed radially inwardly of said first and second motor/generators.

5. An electro-mechanical transmission, as set forth in claim 1, wherein said first, second and third gear members of each planetary gear set comprise a ring gear, carrier and sun gear, respectively, and said first interconnecting member continuously interconnects said sun gear of said first planetary gear sets with said ring gear of said second planetary gear set.

6. An electro-mechanical transmission, as set forth in claim 5, wherein said second interconnecting member continuously interconnects said sun gear of said second planetary gear set with said sun gear of said third planetary gear set.

7. An electro-mechanical transmission, as set forth in claim 6, wherein said first torque-transmitting mechanism selectively connects said carriers of said first and second planetary gear set with said carrier of said third planetary gear set and said output member.

8. An electro-mechanical transmission, as set forth in claim 7, wherein said second torque-transmitting mechanism selectively connects said ring gear of said third torque-transmitting mechanism with ground.

9. An electro-mechanical transmission, as set forth in claim 8, wherein said third torque-transmitting mechanism selectively connects said carrier or ring gear of said second planetary gear set with said sun gear of said second planetary gear set.

10. An electro-mechanical transmission, as set forth in claim 9, wherein said sun gear of said first planetary gear set is connected with said first motor/generator, and said sun gear of said second planetary gear set is connected with said second motor/generator.

11. An electro-mechanical transmission, as set forth in claim 10, wherein said ring gear of said first planetary gear set is connected with said input member.

12. An electro-mechanical transmission, as set forth in claim 11, wherein said carrier of said third planetary gear set is continuously connected with said output member.

13. A two-mode compound split hybrid electro-mechanical transmission, comprising:

an input member for receiving power from a prime mover power source;

an output member for delivering power from the transmission;

first and second motor/generators;

an energy storage device for interchanging electrical power with said first and second motor generators;

a control unit for regulating the electrical power interchange between said energy storage device and said first and second motor/generators and also for regulating electrical power interchange between said first and second motor/generators;

three coaxially aligned planetary gear arrangements, each planetary gear arrangement utilizing first, second and third gear members;

said first and second motor/generators being coaxially aligned with each other and with said three planetary gear arrangements;

at least one of said gear members in said first or second planetary gear arrangement connected to said first motor/generator;

another one of said gear members in said second or third planetary gear arrangement being connected to said second motor/generator;

a first torque-transmitting mechanism selectively connecting one of said gear members associated with each of said first, second and third planetary gear arrangements to each other and to said output member;

a second torque-transmitting mechanism selectively connecting one of said gear members of said third planetary gear set with ground;

a third torque-transmitting mechanism selectively connecting one of said gear members of said second planetary gear set with another of said gear members of said second planetary gear set;

a fourth torque-transmitting mechanism selectively grounding one of said gear members connected by said third torque-transmitting mechanism;

a first interconnecting member continuously connecting one of said members of said first planetary gear met with one of said members of said second planetary gear set;

a second interconnecting member continuously connecting one of said members of said second planetary gear set with one of said members of said third planetary gear sets; and one of said gear members of said first planetary gear arrangement being continuously connected to said input member.

14. An electro-mechanical transmission, as set forth in claim 13, wherein said first, second and third gear members of each planetary gear set comprise a ring gear, carrier and sun gear, respectively, and said first interconnecting member continuously interconnects said sun gear of said first planetary gear sets with said ring gear of said second planetary gear set.

15. An electra-mechanical transmission, as set forth in claim 14, wherein said second interconnecting member continuously interconnects said sun gear of said second planetary gear set with said sun gear of said third planetary gear set.

16. An electro-mechanical transmission, as set forth in claim 15, wherein said first torque-transmitting mechanism selectively connects said carriers of said first arid second planetary gear set with said carrier of said third planetary gear set and said output member.

17. An electra-mechanical transmission, as set forth in claim 16, wherein said second torque-transmitting mechanism selectively connects said ring gear of said third torque-transmitting mechanism with ground.

18. An electro-mechanical transmission, as set forth in claim 17, wherein said third torque-transmitting mechanism selectively connects said carrier or ring gear of said second planetary gear set with said sun gear of said second planetary gear set.

19. An electro-mechanical transmission, as set forth in claim 18, wherein said sun gear of said first planetary gear set is connected with said first motor/generator, and said sun gear of said second planetary gear set is connected with said second motor/generator.

20. A two-mode compound split hybrid electro-mechanical transmission, comprising:

an input member for receiving power from a prime mover power source;

an output member for delivering power from the transmission;

first and second motor/generators;

an energy storage device for interchanging electrical power with said first and second motor/generators;

a control unit for regulating the electrical power interchange between said energy storage device and said first and second motor/generators and also for regulating electrical power interchange between said first and second motor/generators;

three planetary gear arrangements, each planetary gear arrangement utilizing first, second and third gear members;

at least one of said gear member in said first or second planetary gear arrangement connected to said first motor/generator;

another one of said gear members in said second or third planetary gear arrangement being connected to said second motor/generator;

a first interconnecting member continuously connecting one of said members of said first planetary gear set with one of said members of said second planetary gear set;

a second interconnecting member continuously connecting one of said members of said second planetary gear set with one of said members of said third planetary gear set, both of said members connected by said second interconnecting member being different from said members connected by said first interconnecting member;

one of said gear members of said first planetary gear arrangement being continuously connected to said input member; and four torque-transmitting mechanisms for selectively interconnecting said members of said planetary gear sets with a stationary member or with other members of said planetary gear sets, said four torque-transmitting mechanisms being selectively engaged in combinations of two to provide four available fixed ratios between the input member and the output member.

21. An electro-mechanical transmission as set forth in claim 20, wherein the transmission is characterized by having three available mechanical points of operation at which one of said first and second motor/generators is stationary.

22. A two-mode compound split hybrid electro-mechanical transmission, comprising:

an input member for receiving power from a prime mover power source;

an output member for delivering power from the transmission;

first and second motor/generators;

an energy storage device for interchanging electrical power with said first and second motor/generators;

a control unit for regulating the electrical power interchange between said energy storage device and said first and second motor/generators and also regulating electrical power interchange between said first and second motor/generators;

three coaxially aligned planetary gear members including first, second and third simple planetary gear sets, each simple planetary gear set including a sun gear member, a ring gear member and a planetary carrier assembly rotatably supporting a plurality of planet gears;

said first and second motor/generators being coaxially aligned with each other and with said three simple planetary gear sets;

said ring gear of said first planetary gear set being continuously connected with said input member;

said ring gear of said second planetary gear set being continuously connected with said first motor/generator and said sun gear of said first planetary gear set;

said sun gear of the said second planetary gear set being continuously connected to said second motor/generator as well as said sum gear of said third planetary gear set;

said ring gear of said third planetary gear set being selectively connected to ground;

said planet gears of said second planetary gear set being selectively connected to said sun gear of said second planetary gear set;

said planet gears of said third planetary gear set being continuously connected to said output member; and said planet gears of said first and second planetary gear sets being selectively connected to said planet gears of said third planetary gear set.

23. The electro-mechanical transmission set forth in claim 22, wherein said sun gear of said second planetary gear set is selectively connected to ground.

24. The electro-mechanical transmission set forth in claim 22, wherein said selective connections may be engaged in combinations of two to provide four available fixed ratios between the input member and the output member when no power flows through said first and second motor/generators.

25. The electro-mechanical transmission as set forth in claim 24, wherein the transmission is characterized by having three available mechanical points of operation at which one of said first and second motor/generators is stationary.

26. A two-mode compound split hybrid electro-mechanical transmission, comprising:

an input member, an output member, and first and second motor/generators:

an energy storage device for interchanging electrical power with said first and second motor/generators;

a control unit for regulating the electrical power interchange between said energy storage device and said first and second motor/generators and also for regulating electrical power interchange between said first and second motor/generators;

three planetary gear sets each having first, second and third members;

one of said members of said planetary gear sets being connected to said first motor generator, and another of said members of said planetary gears sets being connected to said second motor/generator;

four torque-transmitting mechanisms selectively connecting members of said planetary gear sets with other members of said planetary gear sets and with ground, one of said torque transmitting mechanisms being operative as a lock-up clutch to lock two of said planetary gear sets into a 1:1 ratio; and first and second interconnecting members continuously connecting members of said planetary gear sets, wherein both of said members connected by said second interconnecting member are different from said members connected by said first interconnecting member;

said four torque transmitting mechanisms being selectively engageable in pairs to provide four fixed ratios between the input member and the output member.

* * * * *